(12) United States Patent
Krasko et al.

(10) Patent No.: US 9,319,730 B2
(45) Date of Patent: Apr. 19, 2016

(54) METHOD AND A SYSTEM FOR TARGETED VIDEO STREAM INSERTION

(71) Applicant: SPB TV AG, Zug (CH)

(72) Inventors: Nikolay Viktorovitch Krasko, Saint-Petersburg (RU); Fedor Seregeevitch Ezhov, Saint-Petersburg (RU)

(73) Assignee: SPB TV AG, Zug (CH)

( * ) Notice: Subject to any disclaimer, the term of this patent is extended or adjusted under 35 U.S.C. 154(b) by 101 days.

(21) Appl. No.: 14/153,185

(22) Filed: Jan. 13, 2014

(65) Prior Publication Data

US 2015/0201227 A1    Jul. 16, 2015

(51) Int. Cl.
| | |
|---|---|
| *H04N 21/2668* | (2011.01) |
| *H04N 21/45* | (2011.01) |
| *H04N 21/81* | (2011.01) |
| *H04N 21/258* | (2011.01) |

(Continued)

(52) U.S. Cl.
CPC ..... *H04N 21/2668* (2013.01); *H04N 21/23418* (2013.01); *H04N 21/23424* (2013.01); *H04N 21/234309* (2013.01); *H04N 21/25841* (2013.01); *H04N 21/25883* (2013.01); *H04N 21/440218* (2013.01); *H04N 21/4524* (2013.01); *H04N 21/4532* (2013.01); *H04N 21/64322* (2013.01); *H04N 21/812* (2013.01); *H04N 21/8456* (2013.01)

(58) Field of Classification Search
CPC ............. G06Q 30/02; G06Q 30/0269; G06Q 30/0251; G06Q 30/0241; G06Q 30/0255; H04N 21/812; H04N 21/25891; H04N 21/4532; H04N 21/44222; H04N 21/2668; H04N 21/4622; H04N 21/23424; H04L 67/306

See application file for complete search history.

(56) References Cited

U.S. PATENT DOCUMENTS

2003/0233656 A1\* 12/2003 Sie et al. .................. 725/46
2007/0005795 A1    1/2007 Gonzalez (Continued)

OTHER PUBLICATIONS

International Search Report from PCT/RU2014/001003; A. Korsunskiy; Jun. 10, 2015.

(Continued)

*Primary Examiner* — Benjamin R Bruckart
*Assistant Examiner* — Krista A Krahn
(74) *Attorney, Agent, or Firm* — BCF LLP

(57) ABSTRACT

There is provided a method of delivering a video stream, the method executable at a network transmission device. The method comprises: identifying a stream sent to a plurality of subscribers; locating a promotional segment in the identified stream; transmitting a first replaced promotional segment to a first subscriber, the first replaced promotional segment having been selected based on a subscriber attribute associated with the first subscriber, the first replaced promotional segment replacing the promotional segment; transmitting a second replaced promotional segment to a second subscriber the second replaced promotional segment having been selected based on a subscriber attribute associated with the second subscriber, the second replaced promotional segment replacing the promotional segment; and resuming transmitting of the identified stream to the first subscriber and the second subscriber following transmission of the respective first and second replaced promotional segments. Execution of the method allows targeted advertising by selecting individual promotional segments to reach specific subscribers by selective insertion in a broadcast stream.

18 Claims, 7 Drawing Sheets

(51) Int. Cl.
*H04N 21/2343* (2011.01)
*H04N 21/845* (2011.01)
*H04N 21/234* (2011.01)
*H04N 21/4402* (2011.01)
*H04N 21/643* (2011.01)

(56) References Cited

U.S. PATENT DOCUMENTS

2007/0283384 A1* 12/2007 Haeuser et al. .............. 725/34
2008/0235746 A1* 9/2008 Peters et al. .............. 725/111
2009/0187939 A1* 7/2009 Lajoie ........................ 725/34
2011/0200094 A1 8/2011 Kalra et al.
2012/0137015 A1* 5/2012 Sun ............................ 709/231
2013/0237250 A1 9/2013 Annamalai et al.

OTHER PUBLICATIONS

Yashenkov, Ott—novyi vitok razvitiya televideniya [online], Jan. 2011, [retrieved on Jun. 1, 2015]. Retrieved from the Internet: http://www.mobilecomm.ru/wp-content/uploads/pdf.magazine/2011/mtk_01-2011.pdf, p. 24-28.

English translation of Yashenkov, Ott—novyi vitok razvitiya televideniya, p. 24-28.

* cited by examiner

US 9,319,730 B2

METHOD AND A SYSTEM FOR TARGETED VIDEO STREAM INSERTION

CROSS-REFERENCE

None.

FIELD

The present technology relates to video delivery systems in general and specifically to a method and a system for targeted video stream insertion.

BACKGROUND

Multimedia service providers such as cable TV, IPTV, mobile network operators and Internet service providers (ISPs) provide a variety of entertainment, information, and interactive services. Typically, audio and animated video is broadcast in a so-called "stream" format, which allows recipient subscribers to receive the content in sequence without the need to completely download or buffer the entire file. During streaming, each recipient receives segments, or messages, containing requested content.

Advertising media, such as promotional segments of informative or persuasive material separate from the requested content, may also be rendered. With conventional multimedia stream systems, the requested content (such as a cable TV channel) is typically broadcasted and received by multiple users. Hence, all the requesting users receiving the same requested content stream (such as the same cable TV channel, for example), also receive the same promotional segment as it is spliced or inserted in the conventional multimedia stream.

SUMMARY

Configurations herein are based, in part, on the observation by the inventors that conventional streaming servers send the same media stream to each of a plurality of users. Each of multiple users viewing a particular channel, such as a cable TV channel, emanating from the streaming server receives the same media content.

Therefore, these mechanisms and standards do not provide any options convenient for targeted (personalized) ads. All client devices connected to one streamer receive the same content, including the same content of the ads. Thus, if a TV provider wants to display special ads for some of the clients receiving the given content (such as the given cable TV channel), he or she needs a separate facility of Splicer, Broadcast Automation Server and Streamer for each group of clients. Further, such a conventional approach allows only organization of personalized ads based on geographic targeting, while targeting based on, say, gender of age of the client, is not really possible.

Unfortunately, therefore, conventional approaches to multimedia services and transmission suffer from the shortcoming that there is no individualization of the media stream sent to individual users. Media providers are unable to inject personalized media content, such as personalized advertisements, promotional segments, or even user requested content, into the media stream sent to an individual subscriber device.

Accordingly, configurations herein substantially overcome the shortcomings of transmission insertion granularity by allowing real-time insertion of a promotional segment such as an advertisement into individually delivered streams destined for individual users. Media content providers can insert individualized promotional segment into predetermined segments of a media content stream that overwrites or replaces a more general content segment. The main media content can be resumed following the individualized promotional segment. Media content providers match or correlate subscriber attributes received from a rendering device associated with the given user, such as a set-top box or a smartphone, with promotional segment deemed of interest or relevance to the subscriber based on the subscriber attributes so-appreciated. The promotional segment merges with the transcoded media content stream sent to each subscriber rendering device such that each subscriber receives the individualized promotional segment and resumes the content from the primary media stream following the personalized promotional segment.

Therefore and generally speaking, there is provided a selection and insertion mechanism for individualized content, which mechanism allows determination of subscriber specific promotional segments according to attributes of a particular subscriber, insertion of the so-determined subscriber specific promotional segments into a transcoded stream split from the broadcast to the plurality of subscribers, and resuming the broadcast stream following the inserted promotional segments to individual subscribers.

The broadcast, or main stream contains media content requested and received by a plurality of subscribers (which can be implemented, but is not limited to, a cable TV channel), and includes promotional segments (advertisements) receivable by the plurality of subscribers. In other words, the main stream contains one or more promotional segments originally destined to all of the plurality of subscribers potentially receiving the main stream.

An advertising server determines the promotional segments for individual subscribers for insertion following a split of the main stream to the subscriber device, such that individual promotional segments may be inserted for each subscriber. The inserted promotional segment overwrites, or otherwise replaces, the existing general promotional segment (or at least a portion thereof) in favor of the subscriber specific promotional segment, and resumes with the main stream after the so-inserted subscriber specific promotional segment.

In some implementations of the present technology, inserted promotional segments are received from an advertising server, and inserted in the transcoded main stream in real time such that the promotional segment can be received in any suitable format from the advertising server and transcoded to match the subscriber device to which it will be rendered.

Configurations disclosed herein perform replacement of parts of a main stream based on predefined rules. Particularly, configurations herein relate to replacement advertisement blocks in IPTV (Internet Protocol Television) or OTT (Over The Top) video streams. The advertisement blocks are replaced with targeted promotional segments that are selected based on the information conveyed by attributes of the subscriber receiving the stream. In some implementations of the technology, the replacement can be performed in real time. Disclosed below is an example configuration for implementing systems and methods for real time insertion of selected promotional segments into individual streams directed to specific subscribers, and resuming mainstream content to each recipient of individualized (selected) promotional segment.

In the examples shown below, configurations disclosed herein depict a method of per-user stream splicing including identifying a stream sent to a plurality of subscribers, and locating a general promotional segment in the identified stream. A streaming server replaces the general promotional segment with selected media in response to attributes, the attributes based on a subscriber receiving the stream, transmits a first replaced promotional segment to a first subscriber and transmits a second replaced promotional segment to a second subscriber. The streaming server then resumes transmitting of the identified stream to the first subscriber and the second subscriber following the first and second replaced promotional segments, allowing targeted advertising by selecting individual promotional segments to reach specific subscribers by selective insertion in a broadcast stream.

According to a first broad aspect of the present technology, there is provided a method of delivering a video stream, the method executable at a network transmission device and the method comprising: identifying a stream sent to a plurality of subscribers; locating a promotional segment in the identified stream; transmitting a first replaced promotional segment to a first subscriber, the first replaced promotional segment having been selected based on a subscriber attribute associated with the first subscriber, the first replaced promotional segment replacing the promotional segment; transmitting a second replaced promotional segment to a second subscriber the second replaced promotional segment having been selected based on a subscriber attribute associated with the second subscriber, the second replaced promotional segment replacing the promotional segment; and resuming transmitting of the identified stream to the first subscriber and the second subscriber following transmission of the respective first and second replaced promotional segments.

In some implementations of the method, the promotional segment is an ancillary informational rendering at the bequest of a third party.

In some implementations of the method, the method further comprises identifying a splice point in the stream, the splice point indicative of a start of the promotional segment; identifying a splice-out point indicative of the end of the promotional segment; and terminating the first and second replaced promotional segments at the splice out point.

In some implementations of the method, the method further comprises identifying a start segment message indicative of the start of the promotional segment; identifying an end segment message indicative of the end of the promotional segment; converting the identified start segment message into the splice point for marking the beginning of the replaced first and second promotional segments; converting the identified end segment message into the splice out point for marking the end of the replaced promotional segment; and splicing respective first and second replaced promotional segments based on the converted splice and splice-out messages.

In some implementations of the method, the stream employs a format supporting start segment and end segment messages.

In some implementations of the method, the stream is at least one of IPTV and OTT video streams, and the splice in and splice out points are respective SCTE-35 messages.

In some implementations of the method, the method further comprises: transcoding the first and second replaced promotional segments in a protocol to correspond to respective rendering devices associated with the first and second subscribers; and splicing the first and second replaced promotional segments into respective streams transcoded according to rendering devices of each of the first and second subscribers, the first and second replaced promotional segments being different.

In some implementations of the method, the splicing occurs in the same stream already addressed to the respective one of the first and second subscribers, the splicing further comprising a real-time insertion of the respective one of the first and second replaced promotional messages in the transcoded stream.

In some implementations of the method, the method further comprises receiving, from a rendering device specific to one of the first subscriber and the second subscriber, the subscriber attribute, the subscriber attribute including at least an identity and a profile indicative of the rendering device associated with the respective one of the first subscriber and the second subscriber and demographic information of the respective one of the first subscriber and the second subscriber.

In some implementations of the method, the method further comprises obtaining geographic information based on an IP address of the rendering device from an external database, the external database for correlating geographic locations with IP addresses.

In some implementations of the method, the method further comprises: receiving, from a rendering device associated with one of the first subscriber and the second subscriber, subscriber attributes associated with the first subscriber and the second subscriber; matching the received subscriber attributes with available promotional segments; and selecting the first replaced promotional segment and the second replaced promotional segment from the available promotional segments based on the received subscriber attributes.

In some implementations of the method, the subscriber attributes denote subscriber information instrumental in differentiation the first subscriber and the second subscriber.

In some implementations of the method, the subscriber information comprises at least some of age, location and gender.

In some implementations of the method, the promotional segment is an advertising segment intended for the plurality of subscribers, and the first and second replacement promotional segments are targeted media intended for the respective first and second subscriber.

In some implementations of the method, the method further comprises receiving, for at least the first subscriber, a network identifier indicative of a rendering device serving the first subscriber and a channel indicative of the stream being rendered to the first subscriber.

In some implementations of the method, the method further comprises receiving, from an advertising server, an indication of a first and second replaced promotional segments, the first and second replaced promotional segments based on the subscriber attribute received from the rendering device at the advertising server, the advertising server configured to correlate the subscriber attribute with advertising parameters corresponding to the first and second replaced promotional segments.

In some implementations of the method, the method further comprises receiving, from one of the advertising server and a transcoder, the first and second replaced promotional segments configured for real time splicing into the stream, the first and second replaced promotional segments corresponding to raw media received from an advertiser and transcoded at the advertising server such that the first and second replaced promotional segments correspond to a transcoding protocol expected by the rendering device.

According to another broad aspect of the present technology, there is provided a network transmission device for delivering a video stream, the network transmission device comprising: a streaming server having an interface to a head end for identifying and receiving a stream sent to a plurality of subscribers; a protocol recognizer for locating a promotional segment in the identified stream; targeting logic for replacing the promotional segment with selected media in response to a subscriber attribute, the subscriber attribute based on a subscriber receiving the stream; a subscriber drop for transmitting a first replaced promotional segment to a first subscriber and for transmitting a second replaced promotional segment to a second subscriber, the first replaced promotional segment and the second replaced promotional segment having been selected by the targeting logic based on respective subscriber attribute, the first and second replaced promotional segments replacing the promotional segment; and the subscriber drop configured to resume transmitting of the identified stream to the first subscriber and the second subscriber following the transmission of the respective one of the first and second replaced promotional segments.

In some implementations of the network transmission device, the streaming server is further operable to: identify a start segment message indicative of the start of the promotional segment; identify an end segment message indicative of the end of the promotional segment; convert the identified start segment message into the splice point for marking the beginning of the first and second replaced promotional segments; convert the identified end segment message into the splice out point for marking the end of the first and second replaced promotional segments; and splice respective first and second replaced promotional segments based on the converted splice and splice-out messages.

In some implementations of the network transmission device, the device further comprises an interface to an advertising server, the interface configured to receive an indication of the first and second replaced promotional segments, the first and second replaced promotional segments based on subscriber attribute received from the rendering device at the advertising server, the advertising server configured to correlate the subscriber attribute with advertising parameters corresponding to the first and second replaced promotional segments.

In some implementations of the network transmission device, the advertising server interface is further configured to receive the first and second replaced promotional segments configured for real time splicing into the stream, the first and second replaced promotional segments corresponding to raw media received from an advertiser and transcoded at one of the advertising server and a transcoder such that the first and second replaced promotional segments correspond to a transcoding protocol expected by the rendering device.

According to yet another broad aspect of the present technology, there is provided at least one non-transitory computer readable medium having instructions encoded thereon, the instructions when executed on a host computing device cause the host computing device to perform a method comprising: identifying a stream sent to a plurality of subscribers; locating a promotional segment in the identified stream; transmitting a first replaced promotional segment to a first subscriber, the first replaced promotional segment having been selected based on a subscriber attribute associated with the first subscriber, the first replaced promotional segment replacing the promotional segment; transmitting a second replaced promotional segment to a second subscriber the second replaced promotional segment having been selected based on a subscriber attribute associated with the second subscriber, the second replaced promotional segment replacing the promotional segment; and resuming transmitting of the identified stream to the first subscriber and the second subscriber following transmission of the respective first and second replaced promotional segments.

Alternate configurations of the technology include a multiprogramming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the technology include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the technology to carry out data access requests. Such arrangements of the technology are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configuration discussed below present a video advertisement platform which can be operable as an automated turnkey solution for per-subscriber content insertion of live and VoD (video on demand) content with video advertisements based on either in-source cue tones or schedule information which is available for various common types of adaptive bitrate streaming technologies for available consumer devices. Features disclosed herein include VoD and live support, adaptive bitrate video advertisement for common technologies, such as HLS (HTTP Live Streaming), HDS (HTTP Dynamic Streaming), DASH (Dynamic Adaptive Streaming over HTTP), Smooth Streaming and RTSP (Real Time Streaming Protocol), as well as support for common device platforms such as mobiles, desktops and TVs and wide range of set-top boxes (STBs). Insertion and splicing as disclosed further below allows per-user video advertisement based on customizable data such as geography, sex, age, device manufacturer, to name several, and interactive advertisement action support (lead URL, email notify, in-app content promotion). Supported transcoded streams include SCTE-35 marks, DTMF tones or XML/JSON schedule as source data of splicing points for splicing program streams and advertisement streams.

Figure 1:
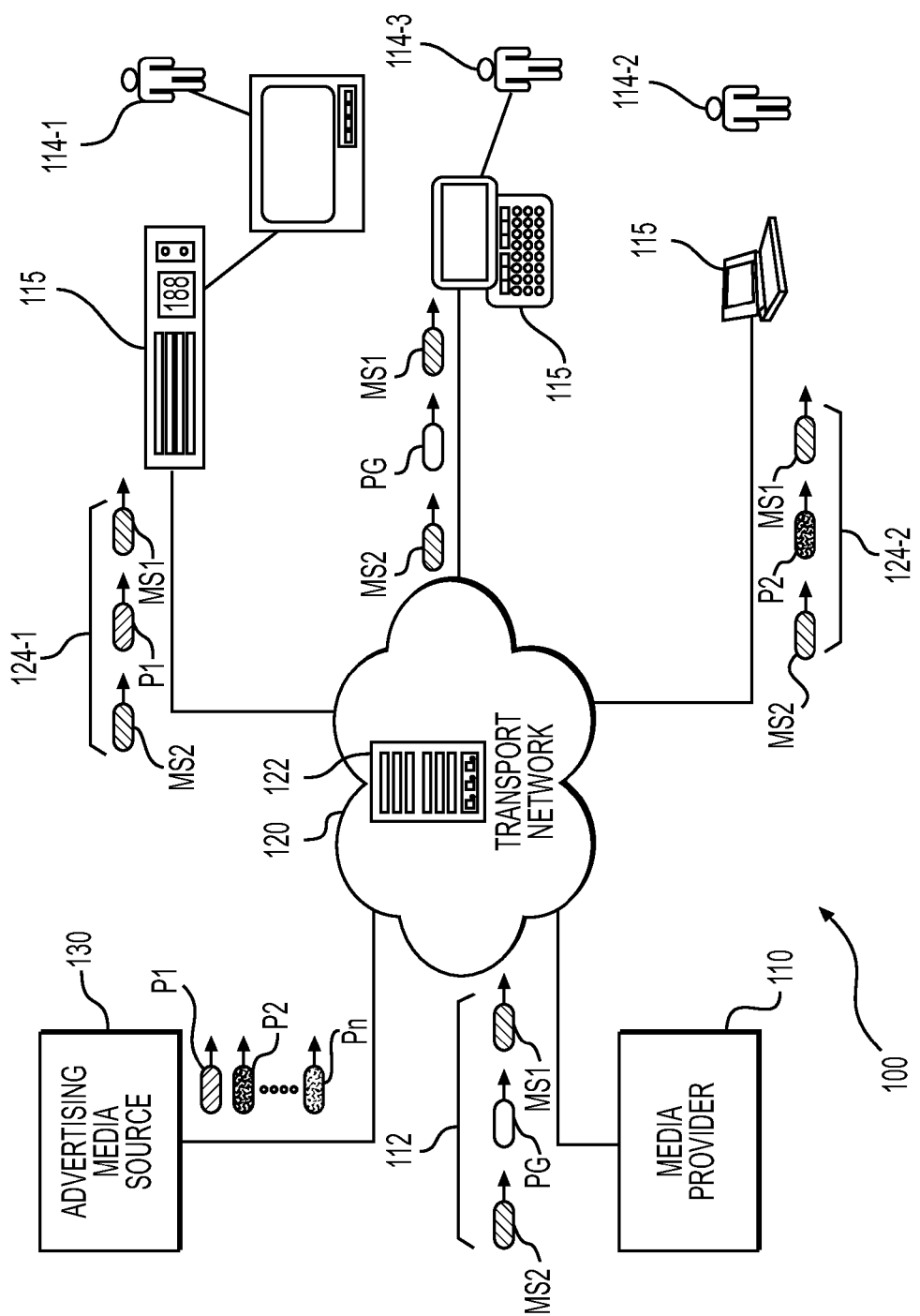
FIG. 1 is a context diagram of a media distribution environment suitable for use with configurations herein.

FIG. 1 is a context diagram of a media distribution environment 100 suitable for use with configurations herein. Referring to FIG. 1, in the media distribution environment 100, a media provider 110 transmits media streams 112 to subscribers 114-1, 114-2, 114-3 (jointly generally referred to as a subscriber 114 or subscribers 114, as the case may be) via an available media transmission network 120, which may include a combination of wired and wireless transmission mediums, including cable, cellular, Internet, WiFi, WiMax, and other suitable mediums for rendering the stream 112 on a rendering device 115 of the recipient subscriber 114. The type of the rendering device 115 is not particularly limited. Non-limiting examples of embodiments of the rendering device 115, as depicted in FIG. 1, may include a set-top box (STB) coupled to a TV, a smart phone, a laptop and the like.

The media streams 112 take the form of a sequence of packets MS1, MS2, and may include general promotional segments (PG) having promotional segment that is not part of the program collectively contained in the sequence of packets MS1, MS2. The general promotional segments PG are also commonly referred to as advertisements (ads).

Based on a variety of contractual, geographical and/or demographic reasons, an advertiser may wish to inject an alternative promotional segment into the media stream 112, typically overwriting at least a portion of the general promotional segment PG so as to preserve the sequence and timing of the requested content in the sequence of packets MS1, MS2. Accordingly, an advertising media source 130 generates promotional segments P1, P2 . . . Pn in any suitable video format, for insertion in the requested (main) media stream 112. For the purposes of the description to be presented herein, "promotional segment(s) Pn" refers generally to a promotional segment for insertion in place of the general promotional segment PG, while promotional segment P1 and promotional segment P2 are example promotional segments, out of the plurality of promotional segments Pn. Promotional segments P1, P2 . . . Pn can be also thought of as "replaced promotional segments" in the sense that they replace the general promotional segment. However, even though the segments to be replaced and the replaced segments are referred to as "promotional", they are not limited to those segments containing ad material and may contain any subscriber-specific content.

As a matter of implementation, the media stream 112 includes many packets; the depiction of the sequence of packets MS1, MS2 in FIG. 1 being just an illustration of the stream flow. In reality, within implementations of the media stream 112, the media stream will likely contain many more packets than the example sequence of packets MS1, MS2.

An intermediary, such as a streaming server 122 is accessible via the transmission network 120 for processing and transcoding the individual media streams 112 to the respective subscribers 114. The streaming server 122 computes, based on a subscriber attribute, the promotional segments P1 and P2 for receipt by the respective subscribers 114-1, 114-2 in lieu of the general promotional segment PG. The promotional segments P1, P2 are inserted into the delivered streams 124-1, 124-2, such that each subscriber 114 receives the content of the requested stream 112 contained in packets MS1 and also receives the respective targeted promotional segments P1, P2, followed by the continued content of the stream 112 in packet MS2. It is noted that some of the subscribers (such as the subscriber 114-3) may still receive the "generic content", i.e. the packets MS1, MS2 with the general promotional segment PG without the subscriber-specific promotional segments P1, P2. Also, even though in the depicted illustration, the two subscribers 114-1 and 114-2 receive different respective personalized promotional segments P1 and P2, it is possible that any two (or more) given subscribers 114 may receive the same personalized promotional segment P1, P2 based on their respective subscriber attributes being indicative of them being interested in the same personalized promotional segment P1, P2.

Figure 2:
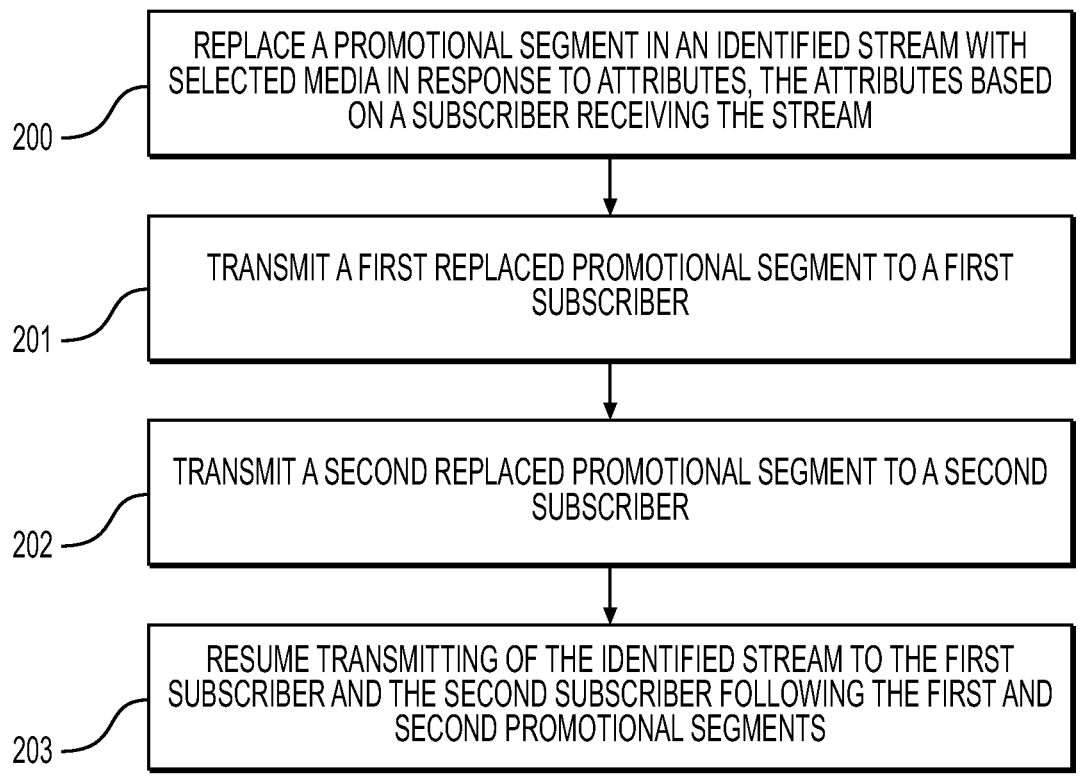
FIG. 2 is a flowchart method of media delivery executables within the media distribution environment of FIG. 1, the method being implemented in accordance with a non-limiting embodiment of the present technology.

FIG. 2 is a flowchart of a method of media delivery, which can be implemented in non-limiting embodiments of the media distribution environment 100 of FIG. 1. Referring to FIGS. 1 and 2, at step 200, the streaming server 122 replaces the general promotional segment PG with selected media in response to attributes, in which the attributes are based on a subscriber 114 receiving the stream 112. The streaming server 122 transmits a first replaced promotional segment P1 to a first subscriber 114-1, as depicted at step 201, and transmits a second replaced promotional segment P2 to a second subscriber 114-2, as shown at step 202. The streaming server 122 then resumes transmitting the identified stream 112 to the first subscriber 114-1 and the second subscriber 114-2 following the respective first and second replaced promotional segments P1 and P2. The first and second subscribers 114-1, 114-2 are merely examples, and many more subscribers may receive the requested stream 112 and individualized promotional segment as in P1 and P2, for which each subscriber 114 potentially receives a different promotional segment P1, P2 as determined by a targeting logic 134, discussed further below in FIG. 3.

The subscriber attributes can include many parameters representative of the subscriber, the subscriber attribute being instrumental in differentiating one of the subscribers 114 from another one of the subscribers 114. For example, the subscriber attribute can include subscriber information including age, location, gender. The subscriber attribute, additionally or alternatively, can have information representative of the user behavior, such as but not limited to last channels watched and a history of viewing selections for use by the targeting logic 134 (FIG. 3).

The promotional segment P1, P2 is inserted into a stream 124 already transcoded for the rendering device 115 of the subscriber 114, and in the example configuration, the transcoded stream 124 employs a format supporting start segment and end segment messages for identifying splice and splice-out points for starting and terminating the promotional segments. The transmitted streams 112, 124 can be implemented as at least one of IPTV (Internet Protocol Television) and OTT (Over The Top) video streams. Within these embodiments, the splice and splice out points may be SCTE-35 messages, as is known in the art. Within other embodiments, where the transmitted streams 112, 124 are implemented differently, the splice and splice out points may be implemented in accordance with other suitable multimedia protocols.

There are several mechanisms which may be employed to identify the splice-in (splice) and splice-out points (splice points, generally) wherein the general promotional segment PG may be overwritten or superceded by the promotional segments P1, P2. In the example arrangement, the splice points may be delivered in a source MP2TS stream as SCTE-35 messages. In alternative embodiments, the splice points may be delivered as DTMF tones in an audio track. Alternatively, the splice points can be defined in an XML, JSON data file which is ingested into a transcoder 140 (to be described below) on periodic basis using the REST protocol. The source splice points can be converted into cue messages by the transcoder 140 and delivered over RTP to the streaming server 122 and/or a third party video advertisements server using REST protocols.

Figure 3:
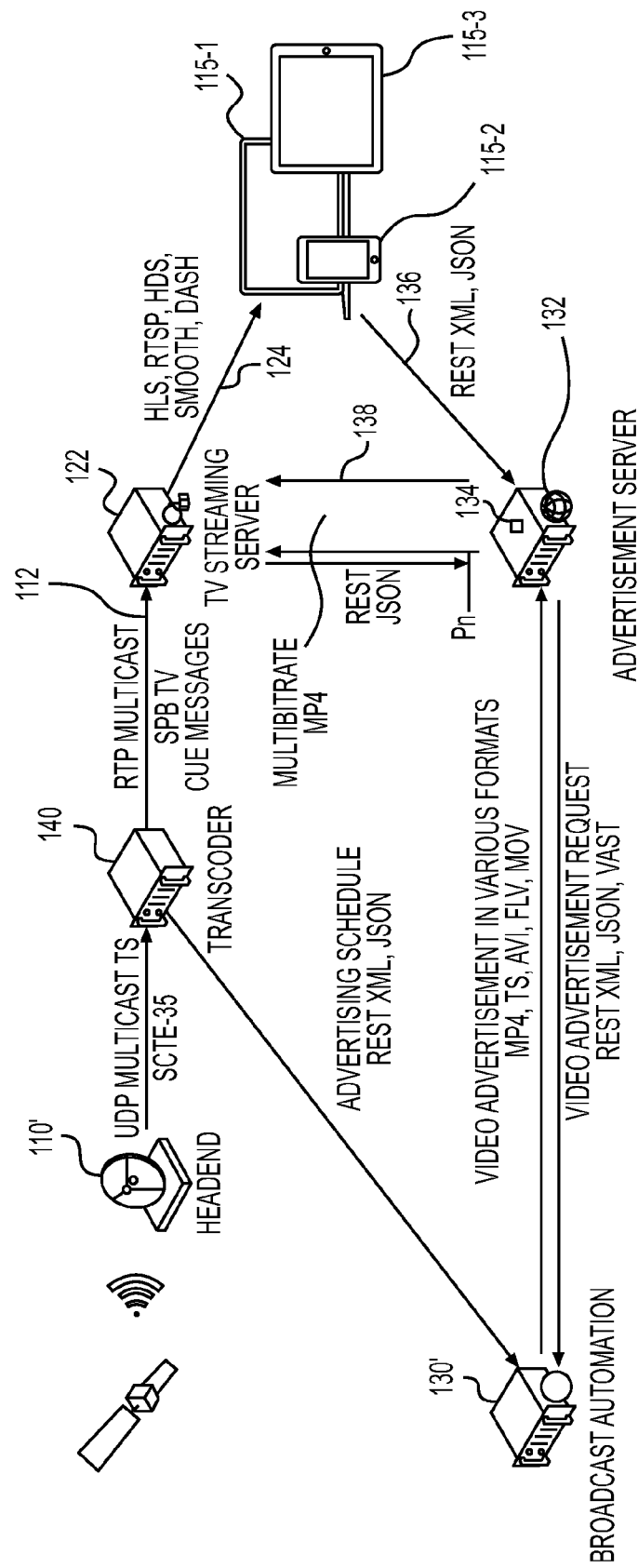
FIG. 3 is a block diagram depicting a specific example of the implementation of the media distribution environment 100 according to FIG. 1.

FIG. 3 is a block diagram depicting a specific example of the implementation of the media distribution environment 100 according to FIG. 1. Referring to FIGS. 1 and 3, the media provider 110 typically takes the form of a head end 110' or other broadcast generation source for large scale distribution of video service, typically providing multiple streams to a large base of subscribers 114. Similarly, the advertising media source 130 may be a broadcast automation server 130' that receives and stores a range of promotional segments P1 . . . Pn for matching and correlation with various subscribers 114 based on the respective subscriber attributes.

A transcoder 140 receives the requested stream 112 from the head end 110', and converts (transcodes) it into a format renderable on the rendering device 115, which may involve generating several transcoded streams, each adapted to the respective destination rendering devices 115.

An advertising server 132 receives the promotional segment(s) Pn in various transcoded formats, also for matching to various rendering devices 115. The advertising server 132 can also receive the user attributes 136 at least partially from the rendering devices 115 (and/or at least partially from other sources). Targeting logic 134 in the advertising server 132 coalesces the subscriber attributes and demographic information for correlation with the promotional segments Pn.

For example, the targeting logic 134 may have a promotional segment of a local retail establishment, and may correlate the location to identify subscribers in the local area. Alternatively, the attributes may indicate subscribers 114 frequently watching sports events, and may correlate that with a promotional segment for a beverage that is statistically known to be popular with sports enthusiasts. Other correlations may be performed by the targeting logic 134, based on available marketing, product distribution, and demographic information.

Based on the correlation, the targeting logic 134 selects a particular promotional segment P1, P2 out of the promotional segments Pn for a particular subscriber 114. Additionally, the targeting logic 134 identifies the rendering device 115 of the particular subscriber 114 for receipt of the particular promotional segment P1, P2. The streaming server 122 receives the particular promotional segment P1, P2 and an identity information of the rendering device 115. The identity information of the rendering device 115 can be an IP address or the like.

The particular promotional segment P1, P2 can be received by the streaming server 122 from the advertisement server 134 (generally depicted at 138). The identity information of the rendering device 115 can be received by the streaming server 122 during the content request originated by the rendering device 115 associated with a particular subscriber 114. The streaming server 122 identifies the particular streams 124-N being sent to an individual subscriber 114 based on the identity of the rendering device 115, and inserts the particular promotional segment P1, P2 into the so-identified stream 124 being sent to that individual subscriber 114.

Figure 4:
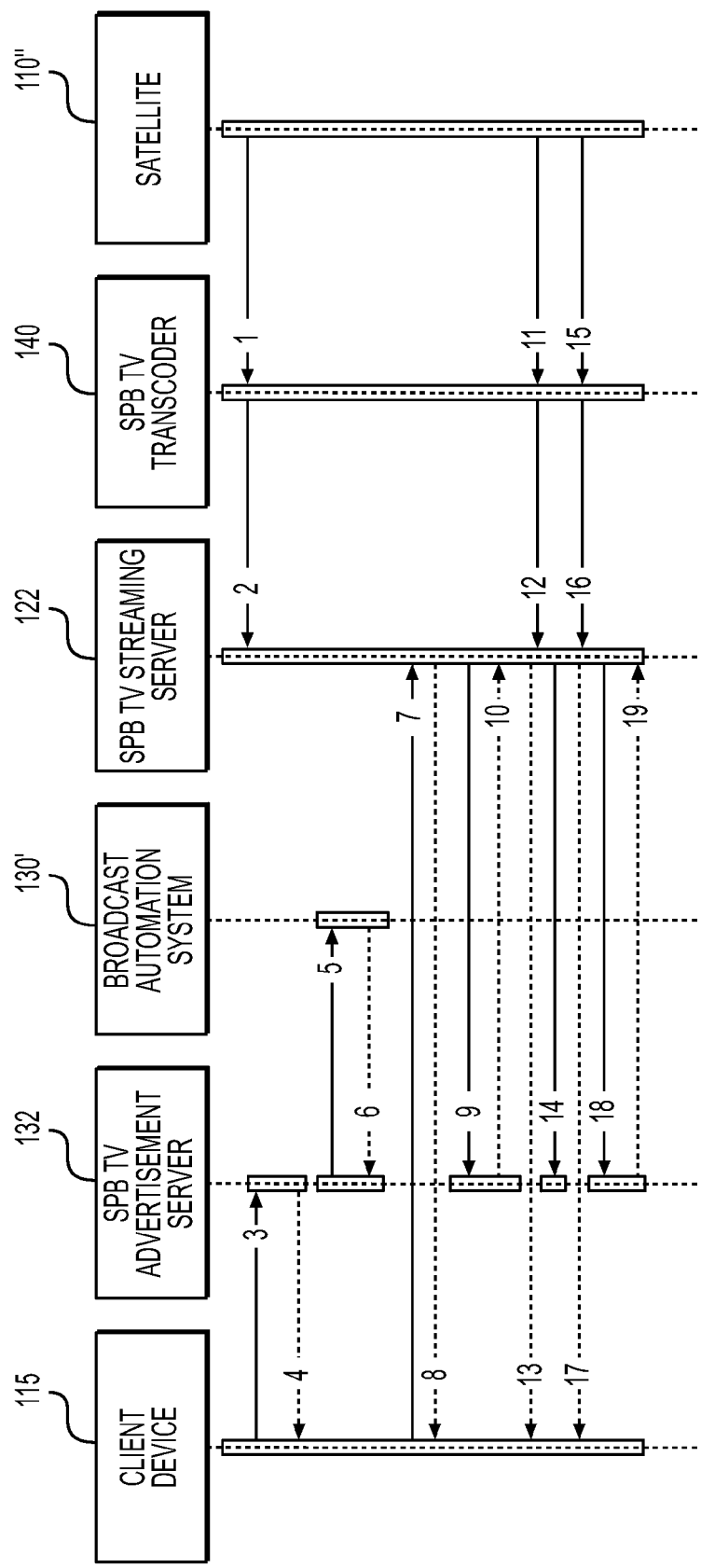
FIG. 4 is a sequence diagram of the media delivery method of FIG. 3.

FIG. 4 is a sequence diagram of the media delivery method of FIG. 2. The sequence diagram of FIG. 4 assumes that the media distribution environment 100 of FIG. 1 implementing the method of FIG. 2 uses a SCTE-35 conversant scheme such as IPTV or the like. Other configurations may employ different transcoding protocols. Referring to FIGS. 1, 3 and 4, at step 1, a satellite 110" in communication with the head end 110' provides a source MP2TS (MPEG-2 Transport Stream) feed with SCTE-35 messages delivered to the transcoder 140.

At step 2, the transcoder 140 encodes source feed into required profiles and converts SCTE-35 messages into cue messages, which are used to identify the start and end of the insertion. The subscriber attributes 136 are received from the rendering device 115, along with a channel request with request to the advertisement (advertising) server 132, as shown at step 3. It is noted that step 3 can be executed concurrently with or before execution of step 2. In some embodiments of the present technology, the channel request can be a VOD request for specific programming, or a channel request for a generally broadcast channel. As has been alluded to before, the subscriber attribute may include some or all of the known data about the subscriber 114 including age, email, sex, device model and geographic location. The subscriber attribute is included in the request for use in correlation with the promotional segments Pn.

The advertisement server 132 replies with unique session ID to the rendering device 115, as shown at step 4. The advertisement server 132 makes a request in REST or other suitable protocol to the Broadcast Automation System 130' for list of video advertisements and media files, as shown at step 5. Relevant data about the subscriber 114 may be included in the request, or alternatively, subscriber attributes may be maintained in a separate database and referenced via a client ID or the session ID. For example, geographic information may be stored in an external, third party database and retrieved for correlating ads with subscribers 114 in a particular geographic area. The Broadcast Automation System 130' replies with all required media files, playlists, and other data needed to fulfill the request, as shown at step 6. Media files are converted on the advertising server 132 into multibitrate MP4 or any other suitable format and saved to storage (not depicted).

The subscriber 114 request for channel stream is received from the streaming server 122, at step 7. The previously generated Session ID from step 4 or unique device identity also known as Unique Device ID (DID or UDID) is included in the request, and at step 8, streaming starts from the streaming server 122 to the rendering device 115. Concurrently, the streaming Server 122 requests the advertisement server 132 for the promotional segment Pn using REST protocol for multibitrate MP4 file or any other suitable format with video advertisement for next splice point in the stream being sent to the rendering device 115, as depicted at step 9.

The promotional segment Pn can be received from the advertising media source 130 in any suitable format, and will be transcoded appropriately for the stream to be delivered to the particular rendering device 115. A particular technical effect can be attributed to the fact that the advertiser, therefore, may deliver promotional material without concern over a transcoding requirement, and the streaming server 122 inserts, or splices, the promotional segment P1, P2 in an appropriate transcoding format to be rendered on the rendering device 115.

The advertisement server 132 replies with the promotional segment P1 and the MP4 (or other format) file is cached on the streaming server 122 side for transmission to the rendering device 115, as shown at step 10. The streaming server 122 monitors for the next promotional segment PG in the stream 112, and at step 11, a SCTE-35 splice point IN message arrives at the transcoder 140. The transcoder 140 converts the SCTE-35 IN message into Cue IN Message (start segment message) that the streaming server 122 is responsive to. The Cue IN message is passed to the streaming server 122 at step 13, and splicing of the source stream 112 with the pre-cached multibitrate MP4 file having the promotional segment P1 starts.

During advertisement (rendering of promotional segment P1), tracking and gathering of statistics information is performed and the statistics information is sent to the advertisement server 132, as shown at step 14. As an example of implementation of step 14, the streaming server 124 can deliver an application to be executed on the rendering device 115 (also known as events or beacons) in various formats including XML, JSON, which application when executed by the rendering device 115 is configured to, upon subscriber consent, gather and transmit to the streaming server 124 various statistical information, including but not limited to subscriber attributes.

At the completion of the promotional segment P1, the SCTE-35 splice point OUT message arrives at the transcoder 140, marking the end of the general promotional PG segment from the media provider, as depicted at step 15. The transcoder 140 converts the SCTE-35 OUT message into a cue OUT (end segment) message, as shown at step 16. In response, the streaming server 122 terminates splicing of the promotional segment P1, and resumes delivery of the originally requested stream 112 to the rendering device 115, as shown at step 17.

Concurrently, or in the background, the streaming server 122 requests, from the advertisement server 132 using REST protocol, a multibitrate MP4 file video advertisement (promotional segment P2, for example) for the next splice point, as depicted at step 18, and at step 19, the advertisement server 132 replies with requested data representative of the promotional segment P2, and the filename of MP4 (or other suitable format) file is cached on the streaming server 122 for rendering at the next splice point.

Figure 5:
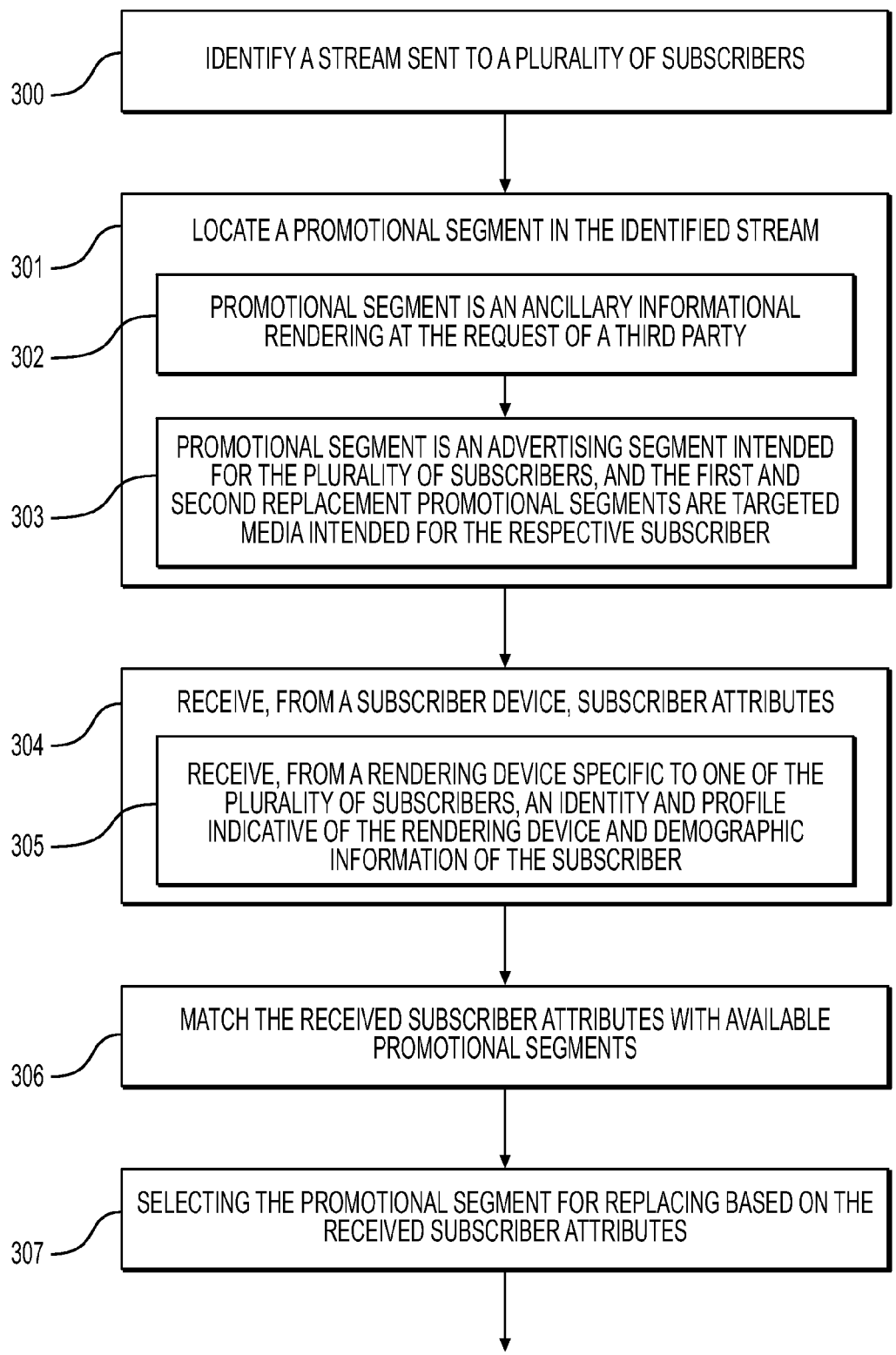
FIGS. 5-7 are a flowchart of alternative embodiments of a method of media delivery and rendering implementable within the media distribution environment of FIG. 1.
Figure 6:
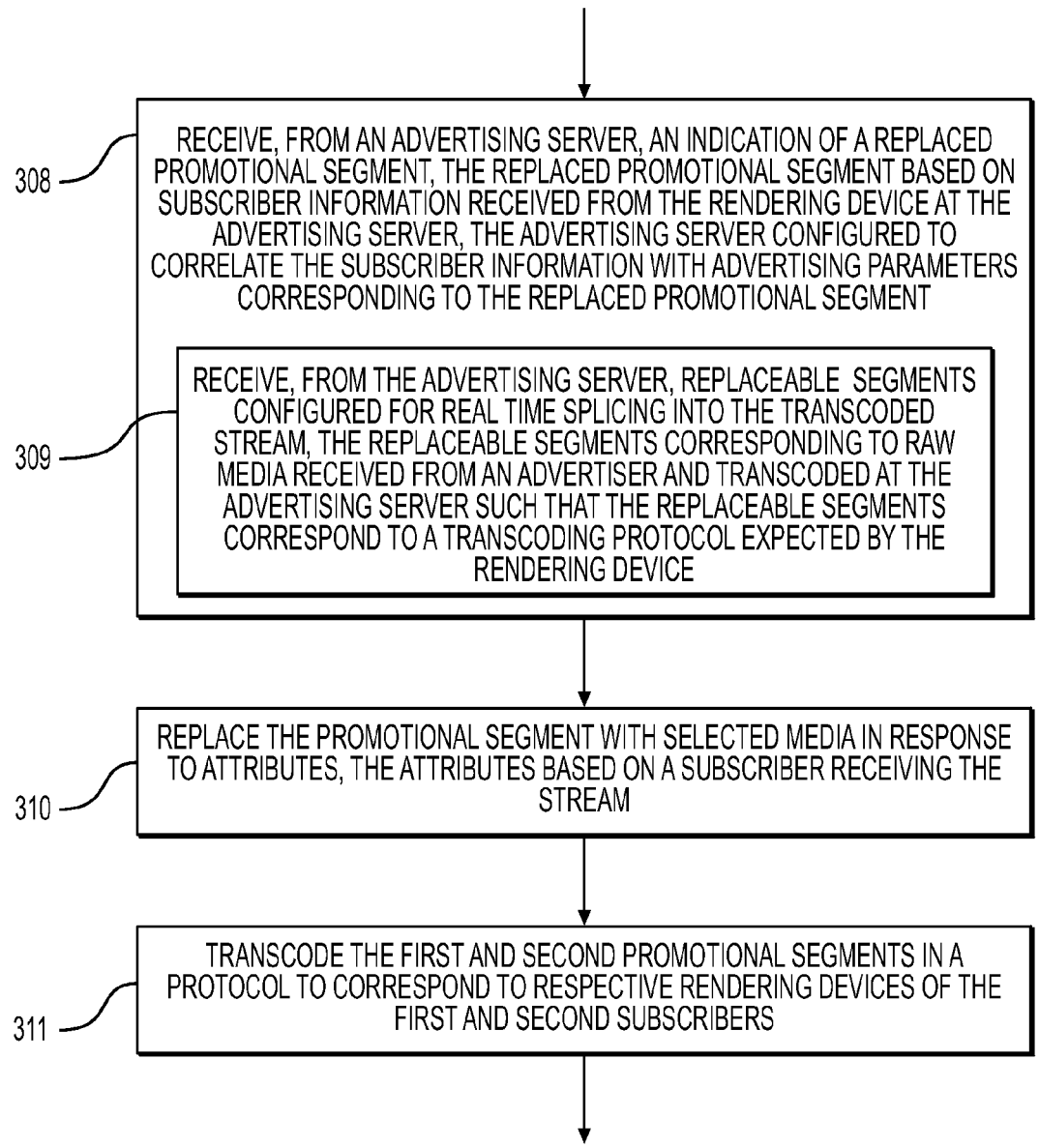
Figure 7:
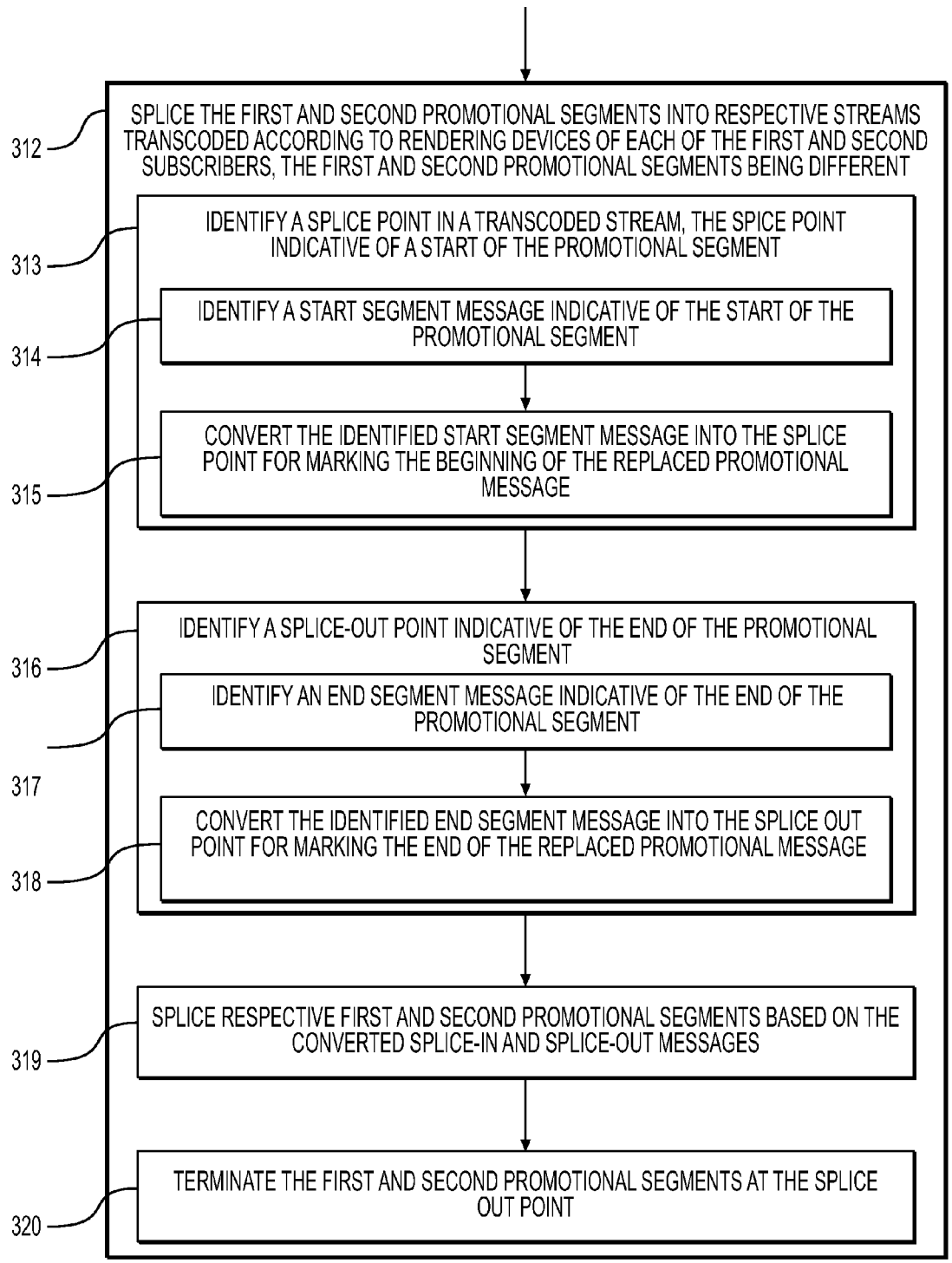

FIGS. 5-7 are a flowchart depicting various embodiments of a method of media delivery and rendering implementable within the media distribution environment 100 of FIG. 1. Referring to FIGS. 1 and 3-7, at step 300, the method of per-user stream splicing as disclosed herein includes identifying a stream sent to a plurality of subscribers 114, and locating a general promotional segment PG in the identified stream, as depicted at step 301. Typically, the general promotional segment PG is an ancillary informational rendering at the bequest of a third party, or advertiser, as depicted at step 302.

Furthermore, the general promotional segment PG is an advertising segment intended generally for the plurality of subscribers 114, and the first promotional segment P1 and second promotional segment P2 are replacement promotional segments P1, P2 that include targeted media intended for the respective subscriber 114-1, 114-2, as shown at step 303.

As the subscriber devices 115 contain much information concerning the subscriber 114, the advertising server 132 receives, from the subscriber device 115, subscriber attributes, as depicted at step 304. This includes various subscriber attributes that may be employed to selected targeted promotional materials, including but not limited to age, email, gender, device model, viewing history, viewing times and geographic location, and may be supplemented from other sources. For example, the advertising server 132 may obtain geographic information based on an IP address and an exchange with an external database correlating geographic locations with IP addresses. Therefore, the advertising server 132 receives, from a rendering device 115 specific to one of the plurality of subscribers, an identity and profile indicative of the rendering device and demographic information of the subscriber 114, as shown at step 305.

The targeting logic 134 matches the received subscriber attributes with available promotional segments Pn, as depicted at step 306, and selects the promotional segment P1 for replacing based on the received subscriber 114-1 attributes, as shown at step 307. The subscriber 114-1 and a targeted promotional segment P1 are now known, and accordingly, the streaming server 122 receives, for one or more of the subscribers 114, a network identifier indicative of the rendering device 115 serving the respective one or more of the subscribers 114 and a channel indicative of the respective media stream 124 being rendered to the one or more of the subscribers 114. Accordingly, at step 308 the streaming server 122 receives, from an advertising server 132, an indication of a replaced promotional segment P1, in which the replaced promotional segment P1 is based on subscriber attributes received from the rendering device 115 at the advertising server 132, such that the advertising server 132 is configured to correlate the subscriber attributes with advertising parameters corresponding to the replaced promotional segment P1.

The promotional segments Pn are generated and received as raw media in any suitable video format from the advertising media source 130 (an advertiser), such that the streaming server 122 receives, from the advertising server 132, replaceable promotional segments Pn configured for real time splicing into the transcoded stream 112, in which the replaceable promotional segments Pn correspond to raw media received from an advertiser and transcoded at the advertising server 132 such that the replaceable promotional segments Pn correspond to a transcoding protocol expected by the rendering device 115, as shown at step 309.

In some embodiments of the present technology, the promotional segments Pn for replacement can overwrite (at least partially) the general promotional segments PG already in the requested stream 112. This is executed, at least partially, such that not to unduly interfere with the viewing experience of the subscriber 114. The streaming sever 122 positions and buffers pending promotional segments Pn for replacement until a suitable insertion point, discussed further below. Therefore, the streaming server 122 replaces the general promotional segment PG (or a portion thereof) with selected media (i.e. the promotional segment P1) based on subscriber attributes, in which the subscriber attributes are based on a subscriber 114 receiving the stream 112, as shown at step 310. The streaming server 122 transcodes, as required, the first promotional segment P1 and second promotional segment P2, as well as any other promotional segments Pn in a protocol to correspond to respective rendering devices 115 of the first 114-1 and second 114-2 subscribers, as depicted at step 311.

At an appropriate time, typically marked by a start of a general promotional segment PG in the requested stream 112, the streaming server 122 splices the first and second promotional segments P1, P2 into respective streams 124-1, 124-2 transcoded according to rendering devices 115 of each of the first 114-1 and second 114-2 subscribers, such that the first and second promotional segments P1, P2 are different targeted promotional segments selected based on the attributes of the receiving subscriber 114, as depicted at step 312. Thus, the individual, targeted promotional segments P1, P2 are individually inserted and rendered to each respective subscriber 114 based on their subscriber attributes as matched or correlated by the targeting logic 134 to the promotional segments Pn.

Splicing occurs in the same stream 124-1 already addressed to the respective subscriber 114-1, such that the splicing further comprising a realtime insertion in the transcoded stream 124-1 The streaming server 122 identifies a splice point in a transcoded stream 112, such that the splice point indicates the start of the promotional segment PG, as shown at step 313. This may include, at step 314, identifying a start segment message indicative of the start of the promotional segment PG, and converting the identified start segment message into the splice point for marking the beginning of the replaced promotional segment P1, as depicted at step 315.

The streaming server 122 then identifies a corresponding splice-out point indicating the end of the promotional segment PG, as disclosed at step 316, which includes identifying an end segment message indicative of the end of the promotional segment PG (step 317), and converting the identified end segment message into the splice out point for marking the end of the replaced promotional segment P1, as depicted at step 318. Similar processing occurs for promotional segment P2 and any other promotional segments Pn. The streaming server 122 splices respective first and second promotional segments P1, P2 based on the converted splice-in and splice-out messages, as depicted at step 319, and terminates the first and second promotional segments P1, P2 at the splice out point, allowing the rendering device 115 to resume the requested content at segment MS2, as disclosed at step 320.

Therefore, the streaming server 122 transmits a first replaced promotional segment P1 to a first subscriber 114-1, transmits a second replaced promotional segment P2 to a second subscriber 114-2, and resumes transmitting of the identified stream 112 to the first subscriber 114-1 and the second subscriber 114-2 following the respective first and second replaced promotional segments P1, P2.

In the example configuration, various protocols and formats are employed. Other suitable formats and protocols are readily evolving, as is known in the art, and may be adapted for use with the methods and configurations herein. An Advertisement Source Container may include MP4, TS, AVI, FLV, MOV, OGG or any other, and Advertisement Source Video Codecs may employ H.264, MPEG 4, WMV, VP8 or any other. Corresponding Advertisement Source Audio Codecs may include AAC, MP3, WMA or any other. A Third Party Advertisement Server Integration Protocol takes the form of REST XML, JSON, VAST, and supported any resolutions. Generally, expected bitrates range up to 20 mbps, given current transport hardware.

Various advantages are afforded by the features disclosed herein, including the following:

- Advertising materials can be chosen based on any set of client attributes.
- Advertising materials can be provided in any suitable video format; it is transcoded 'on the fly' and embedded in the main video stream.
- The solution allows to conduct the replacement for any kind of client's IPTV device—computer, Android®, iPhone®, any STB, etc.
- There is no requirement to transcode ad materials in advance and store them.
- The solution allows to request ad materials from the ad providers in real time.
- Advertising media sources such as advertisers may also interact with the advertising server 132 for administrating the available promotional segments Pn. When the client/advertiser requests the advertisement server 132 for the list of ads (promotional segments Pn) the server 132 can send a request for an ad to the provider, and upon receipt of the response prepare the ad to be shown to the client. Further, the disclosed approach may be integrated in any suitable type of streaming technology, including HTTP Live Streaming, Smooth Streaming, HTTP Dynamic Streaming, RTSP, DASH and MPEG2 TS streams.

Those skilled in the art should readily appreciate that the programs and methods defined herein are deliverable to a computer processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the technology encompassed by the appended claims.

What is claimed is:

1. A method of delivering a video stream, the method executable at a network transmission device, the method comprising:
    identifying a stream sent to a plurality of subscribers;
        locating a promotional segment in the identified stream, the locating being executed by the steps of:
            identifying a splice point in the stream, the splice point indicative of a start of the promotional segment;
            identifying a splice-out point indicative of the end of the promotional segment; and
        obtaining a first replaced promotional segment and a second replaced promotional segment, each of the first replaced promotional segment and the second replaced promotional segment being in a respective format;
    determining a respective protocol corresponding to respective rendering devices associated with the first and second subscribers;
    transcoding the first and second replaced promotional segments from their respective formats into the respective protocol corresponding to the respective rendering devices associated with the first and second subscribers;
    transmitting the first replaced promotional segment transcoded in the respective protocol to a first subscriber, the first replaced promotional segment having been selected based on a subscriber attribute associated with the first subscriber, the first replaced promotional segment replacing at least a portion of the promotional segment;
    transmitting the second replaced promotional segment transcoded in the respective protocol to a second subscriber the second replaced promotional segment having been selected based on a subscriber attribute associated with the second subscriber, the second replaced promotional segment replacing at least a portion of the promotional segment;

the transmitting being executed by means of:
splicing the first and second replaced promotional segments transcribed into respective protocols into respective streams transcoded according to rendering devices of each of the first and second subscribers, the first and second replaced promotional segments being different;
terminating the first and second replaced promotional segments at the splice out point;
resuming transmitting of the identified stream to the first subscriber and the second subscriber following transmission of the respective first and second replaced promotional segments.

2. The method of claim 1, wherein the promotional segment is an ancillary informational rendering at the bequest of a third party.

3. The method of claim 1 further comprising:
identifying a start segment message indicative of the start of the promotional segment;
identifying an end segment message indicative of the end of the promotional segment;
converting the identified start segment message into the splice point for marking the beginning of the replaced first and second promotional segments;
converting the identified end segment message into the splice out point for marking the end of the replaced promotional segment; and
splicing respective first and second replaced promotional segments based on the converted splice and splice-out messages.

4. The method of claim 3 wherein the stream employs a format supporting start segment and end segment messages.

5. The method of claim 3 wherein the stream is at least one of IPTV and OTT video streams, and the splice in and splice out points are respective SCTE-35 messages.

6. The method of claim 1, wherein splicing occurs in the same stream already addressed to the respective one of the first and second subscribers, the splicing further comprising a real time insertion of the respective one of the first and second replaced promotional messages in the transcoded stream.

7. The method of claim 1 further comprising receiving, from a rendering device specific to one of the first subscriber and the second subscriber, said subscriber attribute, said subscriber attribute including at least an identity and a profile indicative of the rendering device associated with the respective one of the first subscriber and the second subscriber and demographic information of the respective one of the first subscriber and the second subscriber.

8. The method of claim 7 further comprising obtaining geographic information based on an IP address of the rendering device from an external database, the external database for correlating geographic locations with IP addresses.

9. The method of claim 1 further comprising:
receiving, from a rendering device associated with one of the first subscriber and the second subscriber, subscriber attributes associated with the first subscriber and the second subscriber;
matching the received subscriber attributes with available promotional segments; and
selecting the first replaced promotional segment and the second replaced promotional segment from the available promotional segments based on the received subscriber attributes.

10. The method of claim 9 wherein the subscriber attributes denote subscriber information instrumental in differentiation the first subscriber and the second subscriber.

11. The method of claim 10, wherein said subscriber information comprises at least some of age, location and gender.

12. The method of claim 1 wherein the promotional segment is an advertising segment intended for the plurality of subscribers, and the first and second replacement promotional segments are targeted media intended for the respective first and second subscriber.

13. The method of claim 1 further comprising receiving, for at least the first subscriber, a network identifier indicative of a rendering device serving the first subscriber and a channel indicative of the stream being rendered to the first subscriber.

14. The method of claim 1, wherein the obtaining a first replaced promotional segment and a second promotional segment comprises receiving, from an advertising server, an indication of the first and second replaced promotional segments, the first and second replaced promotional segments based on the subscriber attribute received from the rendering device at the advertising server, the advertising server configured to correlate the subscriber attribute with advertising parameters corresponding to the first and second replaced promotional segments.

15. A network transmission device for delivering a video stream, the network transmission device comprising:
a streaming server having an interface to a head end for identifying and receiving
a stream sent to a plurality of subscribers;
a protocol recognizer for locating a promotional segment in the identified stream, the locating being executed by the steps of:
identifying a splice point in the stream, the splice point indicative of a start of the promotional segment;
identifying a splice-out point indicative of the end of the promotional segment; and
targeting logic configured to:
obtain a first replaced promotional segment and a second replaced promotional segment, each of the first replaced promotional segment and the second replaced promotional segment being in a respective format, the first replaced promotional segment and the second promotional segment in response to a subscriber attribute, the subscriber attribute based on a subscriber receiving the stream;
determine a respective protocol corresponding to respective rendering devices associated with the first and second subscribers;
transcode the first and second replaced promotional segments from their respective formats into the respective protocol corresponding to the respective rendering devices associated with the first and second subscribers;
a subscriber drop for transmitting a first replaced promotional segment transcoded in the respective protocol to a first subscriber and for transmitting a second replaced promotional segment transcoded in the respective protocol to a second subscriber, the first replaced promotional segment and the second replaced promotional segment having been selected by the targeting logic based on a respective subscriber attribute, the first and second replaced segments replacing the promotional segment; the transmitting being executed by means of:
splicing the first and second replaced promotional segments transcribed into respective protocols into respective streams transcoded according to rendering devices of each of the first and second subscribers, the first and second replaced promotional segments being different;

terminating the first and second replaced promotional segments at the splice out point;

the subscriber drop configured to resume transmitting of the identified stream to the first subscriber and the second subscriber following the transmission of the respective one of the first and second replaced promotional segments.

16. The device of claim 15 wherein the streaming server is further operable to:
identify a start segment message indicative of the start of the promotional segment;
identify an end segment message indicative of the end of the promotional segment;
convert the identified start segment message into the splice point for marking the beginning of the first and second replaced promotional segments;
convert the identified end segment message into the splice out point for marking the end of the first and second replaced promotional segments; and
splice respective first and second replaced promotional segments based on the converted splice and splice-out messages.

17. The device of claim 15 further comprising an interface to an advertising server, the interface configured to receive an indication of the first and second replaced promotional segments, the first and second replaced promotional segments based on subscriber attribute received from the rendering device at the advertising server, the advertising server configured to correlate the subscriber attribute with advertising parameters corresponding to the first and second replaced promotional segments.

18. At least one non-transitory computer readable medium having instructions encoded thereon, the instructions when executed on a host computing device cause the host computing device to perform a method comprising:
identifying a stream sent to a plurality of subscribers;
locating a promotional segment in the identified stream, the locating being executed by the steps of:
identifying a splice point in the stream, the splice point indicative of a start of the promotional segment;
identifying a splice-out point indicative of the end of the promotional segment; and
obtaining a first replaced promotional segment and a second replaced promotional segment, each of the first replaced promotional segment and the second replaced promotional segment being in a respective format;
determining a respective protocol corresponding to respective rendering devices associated with the first and second subscribers;
transcoding the first and second replaced promotional segments from their respective formats into the respective protocol corresponding to the respective rendering devices associated with the first and second subscribers;
transmitting the first replaced promotional segment transcoded in the respective protocol to a first subscriber, the first replaced promotional segment having been selected based on a subscriber attribute associated with the first subscriber, the first replaced promotional segment replacing at least a portion of the promotional segment;
transmitting the second replaced promotional segment transcoded in the respective protocol to a second subscriber the second replaced promotional segment having been selected based on a subscriber attribute associated with the second subscriber, the second replaced promotional segment replacing at least a portion of the promotional segment;
the transmitting being executed by means of:
splicing the first and second replaced promotional segments transcribed into respective protocols into respective streams transcoded according to rendering devices of each of the first and second subscribers, the first and second replaced promotional segments being different;
terminating the first and second replaced promotional segments at the splice out point;
resuming transmitting of the identified stream to the first subscriber and the second subscriber following transmission of the respective first and second replaced promotional segments.

* * * * *